Figure 1:
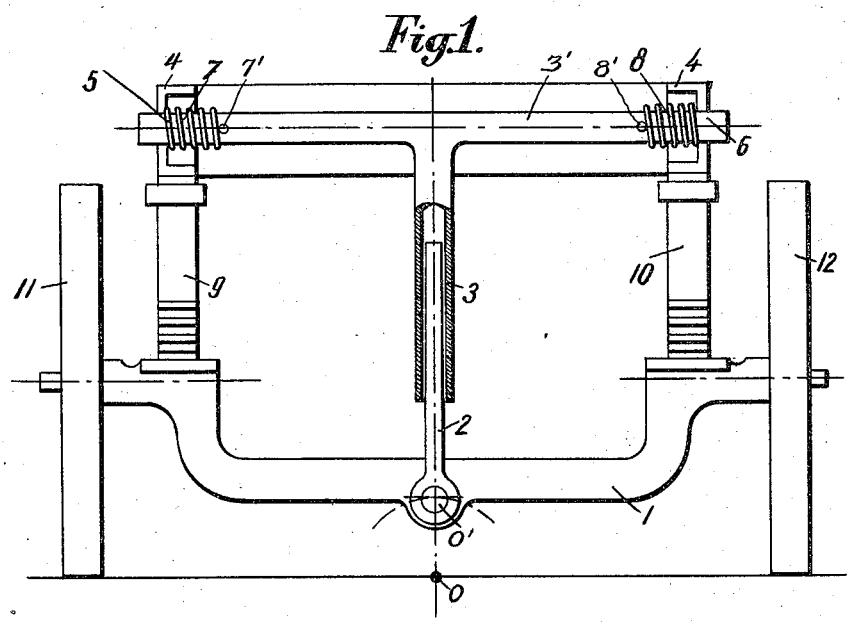

H. MERCIER.
DEVICE FOR WEAKENING THE ROLLING IN SUSPENDED VEHICLES.
APPLICATION FILED MAY 14, 1915.

1,179,130.

Patented Apr. 11, 1916.
4 SHEETS—SHEET 1.

Inventor,
Henri Mercier
by
Pennie Goldsborough & Mills
Attorneys.

H. MERCIER.
DEVICE FOR WEAKENING THE ROLLING IN SUSPENDED VEHICLES.
APPLICATION FILED MAY 14, 1915.
1,179,130.
Patented Apr. 11, 1916.
4 SHEETS—SHEET 2.
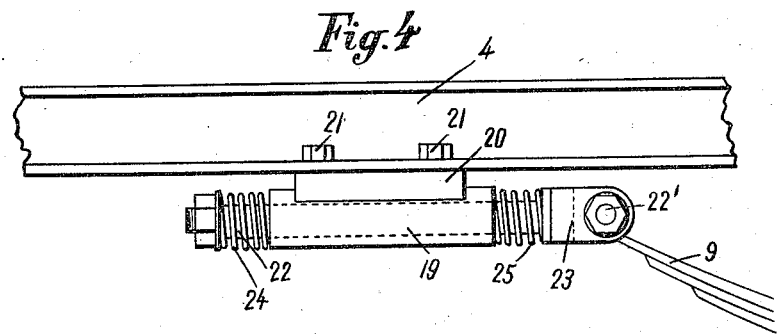
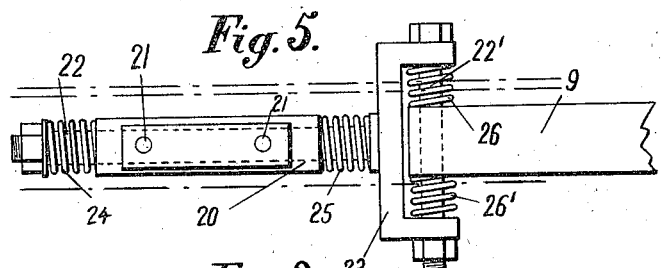
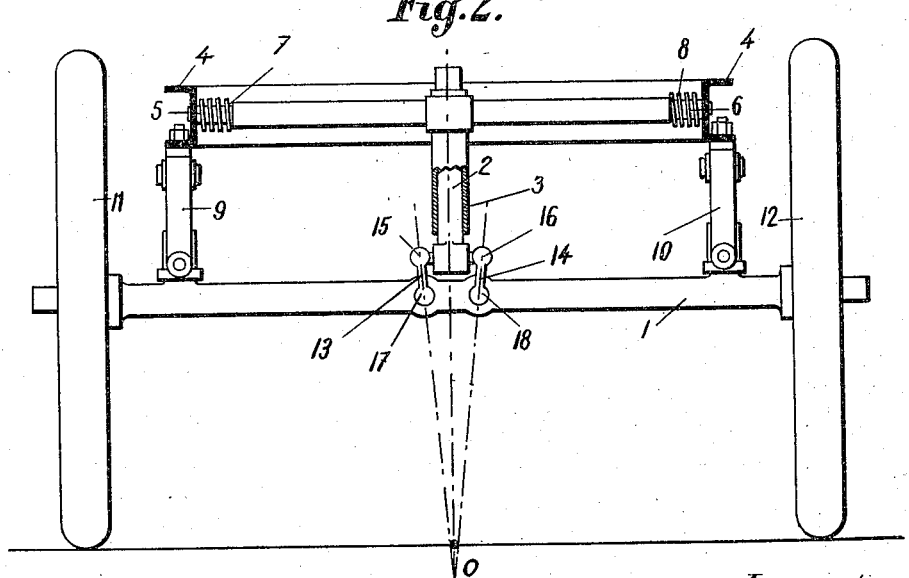

H. MERCIER.
DEVICE FOR WEAKENING THE ROLLING IN SUSPENDED VEHICLES.
APPLICATION FILED MAY 14, 1915.
1,179,130.
Patented Apr. 11, 1916.
4 SHEETS—SHEET 3.
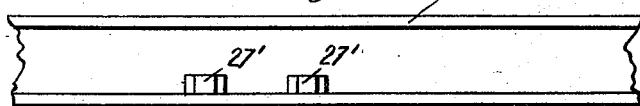
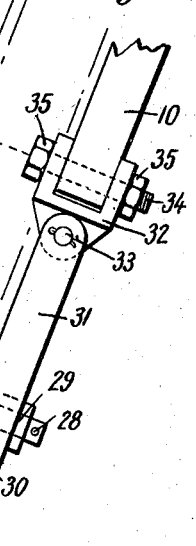
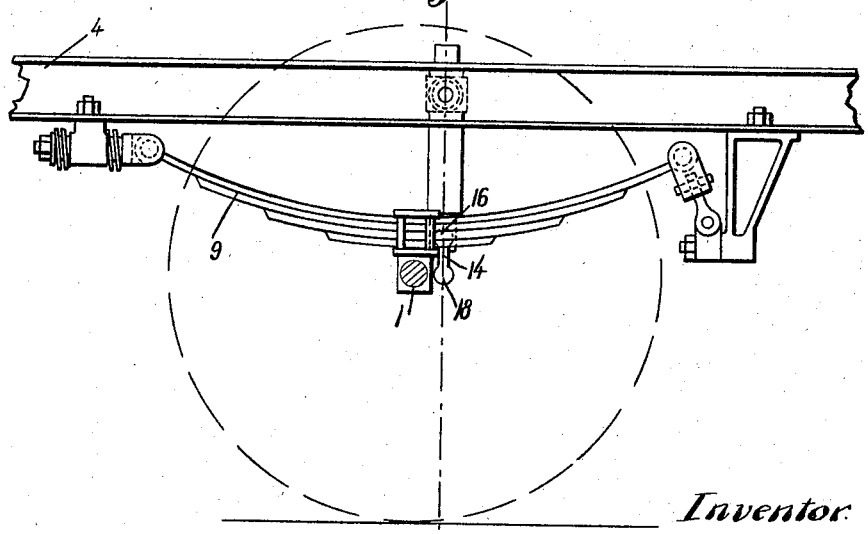
Inventor
Henri Mercier
By
Attorneys H. MERCIER.
DEVICE FOR WEAKENING THE ROLLING IN SUSPENDED VEHICLES.
APPLICATION FILED MAY 14, 1915.
1,179,130.
Patented Apr. 11, 1916.
4 SHEETS—SHEET 4.
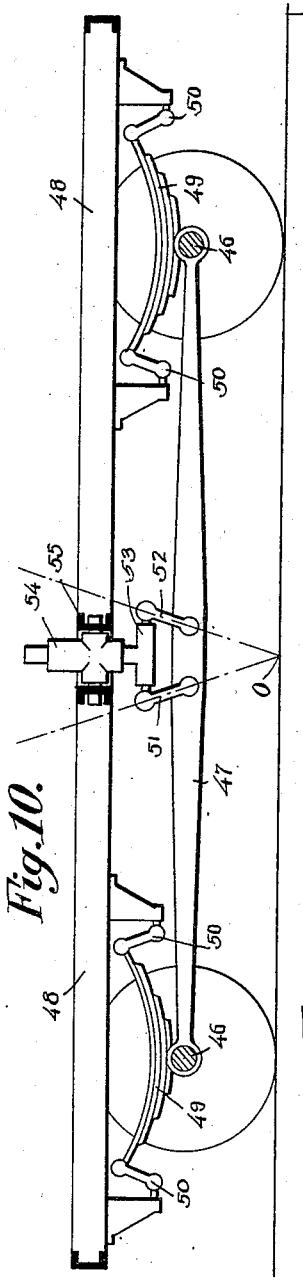
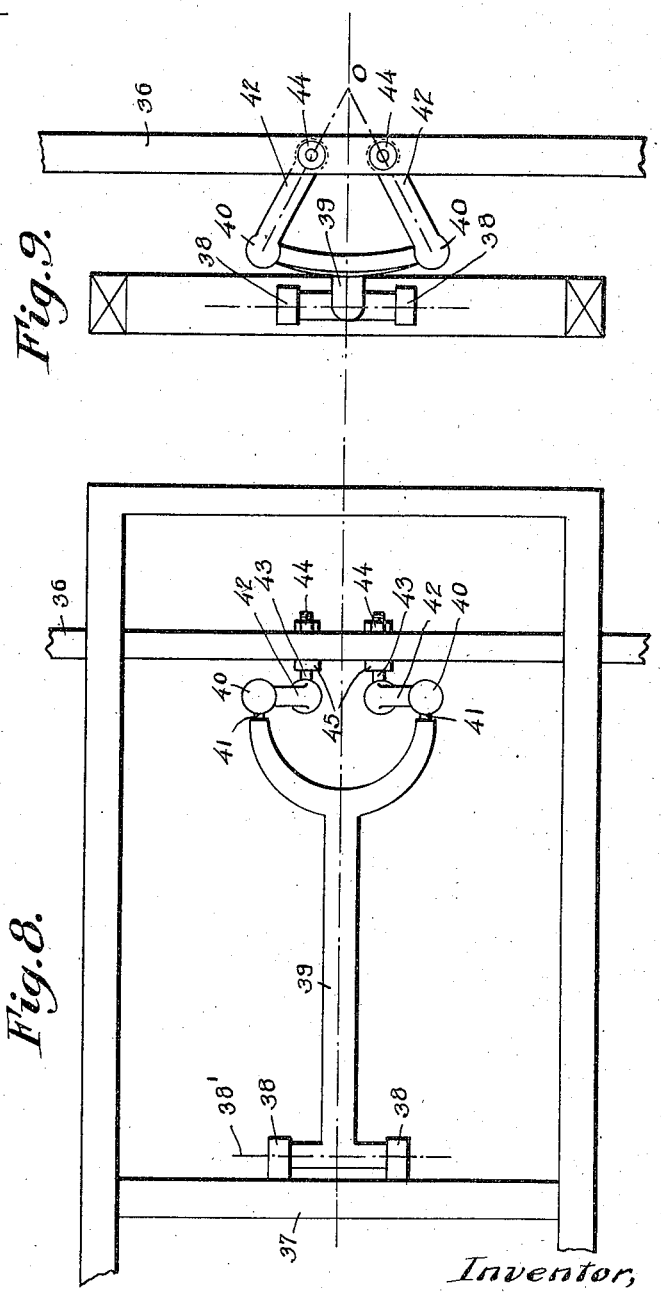

UNITED STATES PATENT OFFICE.

HENRI MERCIER, OF PARIS, FRANCE.

DEVICE FOR WEAKENING THE ROLLING IN SUSPENDED VEHICLES.

1,179,130.  Specification of Letters Patent.  Patented Apr. 11, 1916.

Application filed May 14, 1915. Serial No. 28,020.

*To all whom it may concern:*

Be it known that I, HENRI MERCIER, citizen of the French Republic, residing at Paris, Department of the Seine, in France, have invented certain new and useful Improvements in Devices for Weakening the Rolling in Suspended Vehicles; and I do hereby declare the following to be a full, clear, and exact description of the invention, such as will enable others skilled in the art to which it appertains to make and use the same.

This invention relates to suspension systems for vehicles and has for its object to provide simple and efficient means for preventing or reducing the lateral swaying, or so-called rolling, of the vehicle body on the chassis. This lateral swaying is, of course, greater in vehicles in which the suspension system is very flexible and is also greater in vehicles whose center of gravity is situated at a higher point than usual from the ground.

The invention is illustrated in the accompanying drawing, in which:—

Figure 1 is an elevation, partly in section, of a vehicle chassis provided with the invention; Fig. 2 is an elevation, partly in section, of a vehicle chassis showing a modification of the invention applied thereto; Fig. 3 is a side elevation of the same; Fig. 4 is a side elevation of a detail on a larger scale showing a connection between the vehicle spring and the frame of the chassis; Fig. 5 is a plan view of the same detail, the portion of the frame shown in Fig. 4 being omitted; Fig. 6 is a side elevation of a modified form of connection between the vehicle spring and the frame of the chassis; Fig. 7 is a plan view of the same, the portion of the frame shown in Fig. 6 being omitted; Fig. 8 is a plan view of a device to reduce the lateral swaying provided with means for allowing a certain amount of relative longitudinal movement between the chassis and the vehicle body; Fig. 9 is an end elevation of the same; and Fig. 10 is a side elevation of a vehicle chassis showing how the structure constituting the present invention may be utilized to reduce longitudinal swinging of the vehicle body.

Referring to Fig. 1, there is pivoted at O' to the axle 1, an upwardly extending rod 2 which telescopes in a sleeve 3. The sleeve 3 constitutes a rigid integral depending part of a transversely extending rod 3', the extremities 5 and 6 of which pass through openings in the side members 4 of the chassis frame. Coil springs 7 and 8 interposed between the side members 4 and pins 7' and 8' carried by the rod 3' yieldingly resist movement of the rod 3' transversely of the vehicle.

The suspension devices by means of which the frame of the chassis is mounted on the running gear are represented at 9 and 10, and are here shown as being laminated springs of the usual type, although it will be understood that the invention is capable of use in combination with suspension systems of other types. Two of the vehicle wheels are shown at 11 and 12.

Theoretically, the best place to establish the pivotal connection of the rod 2 would be the point O, as this is obviously the least displaced point of the whole running gear during the normal travel of the vehicle. This, however, is impossible, as the axle must not project so low as to prevent the passage thereunder of obstacles in the roadway, and, therefore, the point O' is chosen as probably the lowest point at which it is safe to pivot the rod 2. The point O' being as close as possible to the point O will be the least displaced point on the running gear at which it is practicable to pivot the rod 2.

When the vehicle is traveling upon uneven roadways, the axle is free to oscillate about the point O. For practical purposes it will be assumed that the axle oscillates about the point O', as this is the nearest possible pivot point to O for the rod 2. These movements of the axle will not all be transmitted to the chassis frame or vehicle body, due to the resilient suspension devices, and the pivotal connection at O'. Furthermore, the whole running gear is free to rise and fall with respect to the chassis frame and without affecting the latter, due to the sliding connection between the rod 2 and the sleeve 3. If, however, any force tends to cant or tilt the vehicle body about any center, except the center O', such movement will obviously be prevented by the connections, 2, 3, 3', between the axle and the chassis frame. The only tilting movements of the vehicle body which are permitted are those which take place about O' as a center, but under such circumstances, the tilting can be only slight and, hence, unobjectionable.

Referring to Figs. 2 and 3, the pivotal connection between the rod 2 and the axle is effected by the links 13 and 14 which are connected by ball and socket joints 15 and 16 to the rod 2, and by similar ball and socket joints 17 and 18 to the axle 1. As shown in Fig. 2, the axes of the links 13 and 14 converge toward the roadway and intersect at the point O. It is this point about which the axle is permitted to swing as a center by the arrangement of links 13 and 14 without materially affecting the vehicle body. In order to allow the necessary relative lateral movement between the axle and the chassis frame and a certain amount of relative longitudinal movement between the same, the springs 9 and 10 may be connected to the chassis frame and the axle, in the manner illustrated in Figs. 4 to 7, inclusive.

Figs. 4 and 5 show one of the sleeves 19 which are adapted to be connected to the longitudinal members 4 of the chassis frame by brackets 20 and bolts 21. Each of these sleeves receives a sliding rod 22 having a forked extremity 23. Springs 24 and 25 tend to yieldingly hold the rod 22 in the position shown in the drawing. The extremity of the vehicle spring is connected to a cross rod 22' mounted in the forked extremity 23 and is yieldingly held in its intermediate position on this cross rod by means of coil springs 26 and 26'. It is, therefore, obvious that limited longitudinal and transverse relative movements between the vehicle body and the axle are permitted, and that the parts will always return to their respective positions shown in the drawings.

Figs. 6 and 7 show one of the brackets 27 which is adapted to be connected to the longitudinal side members 4 of the chassis frame by means of bolts 27'. These brackets carry a pivot pin 28 upon which is mounted a swivel block 29. The block 29 is bored to receive a pin 30, about the axis of which two plates 31 are mounted to oscillate transversely of the vehicle. At their upper ends, the plates 31 are pivoted to a swivel block 32 by means of the pin 33. The extremity of the vehicle spring is pivoted in a bifurcated or forked portion of the block 32 on a pin 34 which is disposed transversely of the vehicle. This construction, although somewhat different from that shown in Figs. 4 and 5, produces substantially the same results.

In Figs. 8 and 9, a modified form of mechanism is shown for reducing the swaying or tilting of the vehicle body in which the sliding joint, shown at 2—3 in Figs. 1 and 2, is eliminated. The axle is shown at 36 and may be connected to the chassis frame in any of the ways above described to permit relative lateral and longitudinal movements between the axle and the chassis frame. The frame of the chassis is provided with a transverse member 37, to which brackets 38 are secured. As shown in Fig. 8, the member 37 and the brackets 38 are situated somewhat in advance of the axle and the member for reducing the lateral swaying shown at 39 extends from the brackets 38 toward the axle. As shown in Figs. 8 and 9, one end of the member 39 is pivoted to the brackets 38 in such a manner that it is permitted to oscillate in a vertical direction, but is braced against oscillation transversely of the vehicle. The other end of the member 39 is forked and the two extremities 41 of the forked end are connected to the links 42 by means of the ball and socket joints 40. The links 42 are in turn connected by similar ball and socket joints to the pins 43 which are rigidly secured to the axle 36 by means of the shoulders 45 and nuts 44. The links 42 are similar to those employed in Fig. 2 and perform the same function. Although the construction shown in Figs. 8 and 9 is somewhat different from that disclosed in Figs. 1 and 2, the results produced are substantially the same. The rise and fall of the running gear with respect to the chassis which is permitted by the sliding connection 2—3 in Figs. 1 and 2 is permitted in Figs. 8 and 9 by oscillations of the lever 39 about the axis 38' which is situated to one side of the axle, hence permitting the rise and fall of the running gear with respect to the chassis.

It is obvious that the improved means herein disclosed for reducing or minimizing the rolling or swaying of the vehicle body may be utilized to prevent longitudinal swinging of the vehicle body on the running gear as well as lateral swinging. This is exemplified in Fig. 10 in which the two axles of the vehicle chassis are shown at 46. They are connected to the frame 48 of the chassis by the springs 49 and the links 50 which permit relative longitudinal and lateral movements between the running gear and chassis.

The two axles 46 are maintained in their spaced relation by means of a longitudinal rod 47. The links 51 and 52 which correspond to the links 13 and 14 of Fig. 2 are connected at their lower ends to this rod 47 by ball and socket joints similar to those employed in Fig. 2. At their upper ends, the links 51 and 52 are connected by means of similar ball and socket joints to the member 53 which slides vertically in a sleeve 54 which, in turn, is rigidly bolted to the transverse beams 55 of the chassis. In Fig. 10, the links 51 and 52 are disposed in a vertical plane running longitudinally of the vehicle chassis instead of transversely thereof, as in Fig. 2. They are, however, inclined in the manner illustrated in Fig. 2, so that their axes intersect in a point 0 on the road surface. It is obvious that by the construction illustrated in Fig. 10, longitudinal swinging or swaying of the vehicle body on the running gear will be prevented or reduced in the same manner that the lateral swaying or rolling is reduced by the construction illustrated in the other figures.

Obviously, many changes may be made in the details of construction without departing from the spirit or scope of the invention, as defined in the accompanying claims.

What I claim is:—

1. The combination with a vehicle chassis frame and a member of the running gear extending between two of the wheels thereof, of a staying device pivotally associated with the mid portion of said member and having a connection with the chassis frame which will not permit lateral angular changes between said device and the chassis frame.

2. The combination with a vehicle chassis frame, one of the axles and the suspension devices, of a staying device pivotally associated with the mid portion of the axle and having a connection with the chassis frame which will not permit lateral angular changes between said device and the chassis frame.

3. The combination with a vehicle chassis frame, the suspension devices and a member of the running gear extending between two of the wheels thereof, of means to permit limited relative lateral movement between the running gear and the chassis frame, and a staying device pivotally associated with the mid portion of said member and having a connection with the chassis frame which will not permit lateral angular changes between the staying device and the chassis frame.

4. The combination with a vehicle chassis frame, the suspension devices and a member of the running gear extending between two of the wheels thereof, of means to permit limited relative lateral and longitudinal movement between the running gear and the chassis frame, and a staying device pivotally associated with the mid portion of said member and having a connection with the chassis frame which will not permit lateral angular changes between the staying device and the chassis frame.

In testimony whereof I affix my signature, in presence of two witnesses.

HENRI MERCIER.

Witnesses:
DE WITT C. POOLE, Jr.,
HENRI COHEN.

Copies of this patent may be obtained for five cents each, by addressing the "Commissioner of Patents, Washington, D. C."